United States Patent [19]

Panster et al.

[11] Patent Number: 5,239,033
[45] Date of Patent: Aug. 24, 1993

[54] FORMED, POLYMERIC ORGANOSILOXANE AMMONIUM COMPOUNDS, METHOD OF THEIR PREPARATION AND USE

[75] Inventors: Peter Panster, Rodenbach; Peter Kleinschmit, Hanau, both of Fed. Rep. of Germany

[73] Assignee: Degussa Aktiengesellschaft, Hanau, Fed. Rep. of Germany

[21] Appl. No.: 836,722

[22] Filed: Feb. 19, 1992

Related U.S. Application Data

[60] Division of Ser. No. 629,161, Dec. 19, 1990, Pat. No. 5,130,396, which is a continuation of Ser. No. 295,893, Jan. 11, 1989, abandoned.

[30] Foreign Application Priority Data

Jan. 12, 1988 [DE] Fed. Rep. of Germany ....... 3800564

[51] Int. Cl.$^5$ ............ C08G 77/26; C08G 79/12; C08G 79/10
[52] U.S. Cl. ............ 528/9; 528/28; 528/38; 528/30; 525/474; 525/475; 210/684; 210/688
[58] Field of Search ............ 528/9, 28, 30, 38; 525/474, 475; 556/425, 9, 10; 210/684, 688

[56] References Cited

U.S. PATENT DOCUMENTS

| | | | |
|---|---|---|---|
| 3,969,261 | 7/1976 | Meller | 252/179 |
| 4,362,885 | 12/1982 | Panster et al. | 556/446 |
| 4,410,669 | 10/1983 | Panster et al. | 525/474 |
| 4,424,332 | 1/1984 | Panster et al. | 528/30 |
| 4,455,415 | 6/1984 | Panster et al. | 528/39 |
| 4,552,700 | 12/1985 | Panster et al. | 556/9 |
| 4,595,740 | 6/1986 | Panster | 528/30 |
| 4,645,847 | 2/1987 | Panster et al. | 556/9 |
| 4,645,848 | 2/1987 | Panster et al. | 556/9 |
| 4,647,644 | 3/1987 | Panster et al. | 528/30 |
| 4,647,679 | 3/1987 | Panster et al. | 556/9 |
| 4,647,682 | 3/1987 | Panster et al. | 556/431 |
| 4,758,277 | 7/1988 | Spruegel et al. | 106/36 |
| 4,772,457 | 9/1988 | Panster et al. | 423/561 |
| 4,845,163 | 7/1989 | Panster et al. | 525/475 |
| 4,851,492 | 7/1989 | Panster et al. | 528/9 |
| 4,855,470 | 8/1989 | Panster et al. | 556/421 |
| 4,954,599 | 9/1990 | Panster et al. | 528/38 |
| 4,999,413 | 3/1991 | Panster et al. | 528/30 |
| 5,003,024 | 3/1991 | Panster et al. | 528/30 |
| 5,019,637 | 5/1991 | Panster et al. | 528/25 |
| 5,061,773 | 10/1991 | Panster et al. | 528/9 |
| 5,093,451 | 3/1992 | Panster et al. | 528/9 |
| 5,094,831 | 3/1992 | Klockner et al. | 423/342 |
| 5,126,473 | 6/1992 | Klockner et al. | 556/473 |
| 5,130,396 | 7/1992 | Panster et al. | 528/9 |
| 5,132,337 | 7/1992 | Panster et al. | 523/117 |

FOREIGN PATENT DOCUMENTS

| | | |
|---|---|---|
| 0151991 | 8/1985 | European Pat. Off. |
| 2433409 | 2/1975 | Fed. Rep. of Germany |
| 3120195 | 7/1982 | Fed. Rep. of Germany |

OTHER PUBLICATIONS

Ullmann's Enzyklopaedie der technischen Chemie, 4th Edition, vol. 13 pp. 279–346.

Primary Examiner—Melvyn I. Marquis
Attorney, Agent, or Firm—Beveridge, DeGrandi, Weilacher & Young

[57] ABSTRACT

Spherical, polymeric organosiloxane ammonium compounds are disclosed with a silica-like skeleton consisting of:

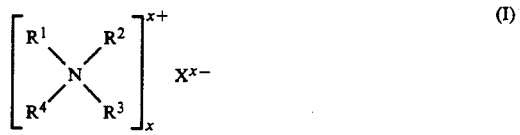

(I)

units in which $R^1$ and $R^2$ stand for a group

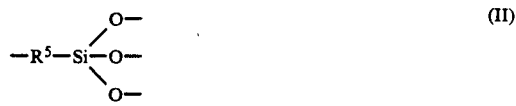
(II)

in which $R^5$ is alkylene the oxygen atoms are saturated by silicon atoms of other groups (II) with the optional inclusion of cross-linking agents, $R^3$ has the meaning of $R^1$ and $R^2$ or stands for hydrogen, alkyl, cycloalkyl or benzyl, $R^4$ is hydrogen or alkyl, cycloalkyl, benzyl, allyl, propargyl, chloroethyl, hydroxyethyl or chloropropyl, X stands for a monovalent to trivalent anion of a protonic acid which forms stable salts with amine bases and x can be a number from 1 to 3.

10 Claims, No Drawings

FORMED, POLYMERIC ORGANOSILOXANE AMMONIUM COMPOUNDS, METHOD OF THEIR PREPARATION AND USE

This application is a divisional of U.S. patent application Ser. No. 07/629,161 filed on Dec. 19, 1990, now U.S. Pat. No. 5,130,396, which was a continuation of U.S. patent application Ser. No. 07/295,893 filed on Jan. 11, 1989, now abandoned.

The subject matter of the invention relates to spherical, polymeric organosiloxane ammonium compounds which exhibit advantages form in the areas of processing and application technology when compared to already-known organosiloxane ammonium compounds because they have a macroscopic spherical form. At the same time, methods are described herein according to which the new solid products can be prepared not only in the spherical size which is ideal for the particular application but also with suitable physical qualities. In addition, the invention relates to methods of using these formed organosiloxane ammonium compounds.

German patent 31 20 195 describes polymeric organosiloxane ammonium compounds which can be used e.g. as strong basic ion exchangers, absorbers, catalytic carriers, active substance carriers in general or as heterogeneous phase transfer catalysts. These insoluble ammonium systems exhibit, compared to comparable systems based on organic polymers like those described e.g. in "Ullmanns Enzyklopädie der technischen Chemie", 4th edition, volume 13, page 279, the advantages of higher thermal, mechanical and chemical stability and their physical qualities as well as their structure are independent to a large extent of external parameters such as pressure, temperature and environment.

Compared to insoluble ammonium compounds which are obtained by a so-called carrier fixation, that is the binding of suitable ammonium groupings to inorganic carriers, and which thereby basically also have an inorganic matrix, the organosiloxane ammonium compounds exhibit in particular the advantage of the higher ammonium group capacity (cf. DE-OS 24 33 409).

The matrix of these organopolysiloxanes can be adapted to the particular requirements of the various applications, e.g. in such a manner that the ammonium group density can be regulated or controlled by the inclusion of so-called cross-linking groups of silicon, titanium, zirconium and aluminum or the porosity can also be influenced. Thus, these products can be extensively varied both chemically and physically. From the standpoint of application technology, their single disadvantage up to the present was that they could only be obtained in lumpy or powdery form and not in the spherical form required for many industrial areas of application.

SUMMARY OF THE INVENTION

The present invention therefore has an object to convert these insoluble organosiloxane ammonium compounds into spherical shaped form while assuring, however, at the same time that the desired physical qualities are maintained.

In further detail, an object of the invention is to provide formed, polymeric, optionally cross-linked organosiloxane ammonium compounds with silica like skeleton, consisting of units of the formula:

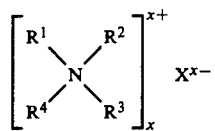

in which $R^1$ and $R^2$ are identical or different and represent a group of the formula:

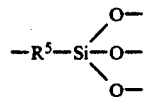

in which the nitrogen atoms in (I) are connected to the silicon atoms in (II) via the $R^5$ groups and $R^5$ represents an alkylene group with 1 to 10 C atoms, a cycloalkylene group with 5 to 8 atoms or a unit of the general formula

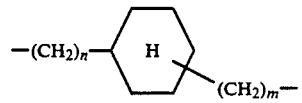

or

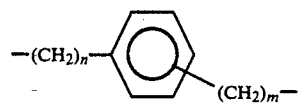

in which n is a number from 1 to 6 and indicates the number of methylene groups in nitrogen position and m is a number from 0 to 6 and the free valences of the oxygen atoms bound to the silicon atom are saturated as in silica skeletons by silicon atoms of other groups of formula (II) and/or with the metal atoms of one or more of the cross-linking binding links

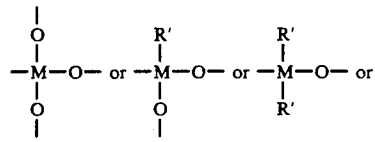

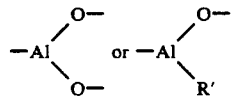

in which M is a silicon, titanium or zirconium atom and R' a linear or branched alkyl group with 1 to 5 C atoms and the ratio of the silicon atoms of the groups of formula (II) to the metal atoms in the binding links is 1:0 to and in which $R^3$ is equal to $R^1$ or $R^2$, or hydrogen, or a linear or branched alkyl group of 1 to 20 C atoms, a cycloalkyl group of 5 to 8 C atoms or is the benzyl group, and $R^4$ is equal to hydrogen, or a linear or branched alkyl group with 1 to 20 C atoms or is a cycloalkyl, benzyl, alkyl, propargyl, chloroethyl, hydroxyethyl, or chloropropyl group consisting of 5 to 8 C atoms and X is an anion with the valence of x equal to 1 to 3 and selected from the group of halogenide, hypochlorite, sulfate, hydrogen sulfate, nitrite, nitrate, phosphate, dihydrogen phosphate, hydrogen phosphate, carbonate, hydrogen carbonate, hydroxide, chlorate, perchlorate, chromate, dichromate, cyanide, cyanate, rhodanide, sulfide, hydrogen sulfide, selenide, telluride, borate, metaborate, azide, tetrafluoroborate, tetraphenylborate, hexaflourophosphate, formate, acetate, propionate, oxalate, triflouroacetate, trichloroacetate or benzoate.

The compounds of the invention are macroscopically spherical shaped particles with a diameter of 0.01 to 3.0 mm, a specific surface area of 0 to 1000 m$^2$/g, a specific pore volume of 0 to 5.0 ml/g, a bulk density of 50 to 1000 g/l as well as a dry substance basis in relation to volume of 50 to 750 g/l.

In a more preferred aspect, the spherically formed, polymeric organosiloxane ammonium compounds are those in which $R^5$ is a linear or branched alkylene group.

A still further group of preferred spherically formed, polymeric organosiloxane ammonium compounds are those in which $R^1$, $R^2$ and $R^3$ are identical, $R^4$ is the methyl group and X is equal to chloride, bromide or iodide.

It is an important feature of the present invention that the compounds of the invention are macroscopic spherical particles with a diameter of 0.01 to 3.0 mm, preferably 0.1 to 2.5 mm, a specific surface of 0 to 1000 m$^2$/g preferably 0 to 700 m$^2$/g a specific pore volume of 0 to 5.0 ml/g, preferably 0 to 3.0 ml/g, a bulk density of 50 to 1000 g/l, preferably 100 to 900 g/l and a dry substance volume of 50 to 750 g/l, preferably 100–700 g/l.

The concept "dry substance in relation to volume" is defined in DIN specification 54 408. It indicates the content of dry substance in a liter of moist product and is commonly used to characterize ion exchangers. The theoretical volume capacity relevant for practical use can be calculated from the dry substance in relation to volume via the theoretical weight capacity.

It turned out that $R^5$ can be a linear or branched alkylene group without considerable material differences occurring in the final product.

Typical examples for units of polymeric organosiloxane ammonium compounds in accordance with the invention are:

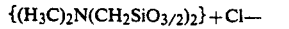

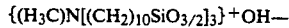

The polymeric solid, spherically formed ammonium compounds according to formula (I), in which $R^1$, $R^2$ and $R^3$ have the same meaning, are especially preferable from the i viewpoint of thermal stability and inertness to chemical attacks, especially by bases, as well as regards insolubility. According to a preferred embodiment of the invention, $R^1$, $R^2$ and $R^3$ are identical, $R^4$ is the methyl group and X is chloride, bromide, iodide.

A polymer built up of recurring polymeric units of the formula:

exhibits particular advantages as regards the availability of initial materials and the material qualities of the formed, polymeric ammonium compound.

An especially important feature of the invention resides in a method for preparing the formed organosiloxane ammonium compounds as defined herein. The basic method provides that a formed, spherical, polymeric organosiloxane amine compound obtainable according to the preparative techniques of German patent application P 38 00 563.8 filed concurrently herewith is quaternized. The entire disclosure thereof is relied on and incorporated herein.

This method of the invention, provides that a secondary or a tertiary aminosilane of the general formula is dissolved:

in which $R^6$ and $R^7$ are identical or different and represent a group of the general formula:

$R^5$ has the same meaning as in formula (II), $R^9$ is a linear or branched alkyl group with 1 to 5 C atoms an $R^8$ is equal to $R^6$ and $R^7$ or hydrogen, a linear or branched alkyl group with 1 to 10 C atoms, a cycloalkyl group consisting of 5 to 8 C atoms or to the benzyl group.

The dissolving in the solvent can be carried out optionally after the addition of one or more cross-linking agents of the general formula:

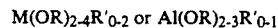

in which M is a silicon, titanium or zirconium atom, and R' a linear or branched alkyl group with 1 to 5 C atoms and the ratio of silicon atoms of the groups of the general formula (IV) to the metal atoms in the cross-linking agents is 1:0 to 1:10.

A customary solvent can be used which is miscible to a great extent in water but dissolves aminoorganosilane and cross-linking agents.

An amount of water is added that is sufficient at least for the complete hydrolysis and condensation. The water is added to the solution under agitation. The reaction mixture is then allowed to gel under further agitation at a determined temperature in a range from room temperature to 200° C. under the condition that it is compounded and homogenized with a customary solvent, at the start of gelation or up to one hour thereafter, in an amount of 10 to 2000% by weight, preferably 50 to 500% by weight, in relation to the total amount of aminoorganosilane (III) and optionally of cross-linking agents.

This solvent is non-soluble in water to a great extent but dissolves the reaction mixture which has gelled (or started to gel).

Water is added in the amount of 10 to 2000% by weight, preferably 50 to 1000% by weight, in relation to the total amount of aminoorganosilane and optional cross-linking agents, to the viscous homogenizate immediately or over a period of time up to one hour, with optional elevation of the temperature originally set.

The organic phase, which now contains siloxane, is dispersed in the liquid two-phase system and the solid which forms in the form of spheres is separated after a reaction time sufficient therefor at room temperature to 200° C. from the liquid phase and then optionally extracted, dried at room temperature to 250° C., optionally under protective gas or in a vacuum, and is tempered 1 to 100 hours at temperatures from 50° to 300° C. and/or classified.

The polymeric, formed organosiloxane amine obtained in this manner of the general formula:

(V)

in which $R^1$, $R^2$ and $R^3$ have the same significance as in formula (I) is reacted with a stoichiometric, preferably excess amount of:

a) a linear or branched alkyl halogenide containing 1 to 20 C atoms, a cycloalkyl halogenide or benzyl halogenide containing 5 to 8 C atoms in which the halogen is chlorine, bromine or iodine atom, or b) an inorganic or organic protonic acid.

Optionally, the reaction is carried out in the presence of a solvent or solubilizer selected from the group of cyclic or open-chain ethers, chlorinated hydrocarbon compounds, aliphatic or aromatic nitro compounds, aliphatic or aromatic nitriles, open-chain or cyclic aliphatic hydrocarbons, unsubstituted aromatics or aromatics substituted with alkyl groups, linear or branched alcohols with 1 to 12 C atoms, symmetrical or asymmetric ketones with 3 to 8 C atoms or of dimethyl formamide, dimethyl sulfoxide or of water. Temperatures from room temperature to 250° C. and employed with a pressure corresponding to the sum of the partial pressures of the components of the reaction mixture at the particular temperature over a period of a few minutes to several days.

The polymeric, formed organosiloxane ammonium product created is optionally first freed from gaseous components, then separated according to common work-up measures from the liquid phase, washed with one of the cited solvents or with water or extracted, or optionally treated in the solvent at elevated temperature.

The product is then separated from solvent and is dried at normal pressure under a vacuum or under protective gas, partially or completely, at a temperature from room temperature to 250° C. for 1 to 60 hours. The recovered product is tempered at 100° to 300° C. for a period of up to 100 hours and classified. The sequence of these work-up measures can be varied.

A preferred embodiment of the method of the present invention provides that the formed, polymeric amine of formula (V) is quaternized undried and while still moist with solvent immediately after its formation with a linear or branched alkyl halogenide containing 1 to 20 C atoms, with a cycloalkyl halogenide containing 5 to 8 C atoms or with benzyl halogenide in which the halogen group is chlorine, bromine or iodine.

This embodiment is thus used with preference in quaternizations with quaternizing agents of class a). However, a preceding drying can also be carried out in the case of a reaction of the amine of formula (V) with protonic acids (quaternizing agents of class b).

If quaternizing agents of class a) are used, stoichiometric amounts are essentially sufficient for achieving a complete conversion of the amine according to formula (v) to an ammonium compound according to formula (I).

However, as regards a more rapid carrying out of the quaternization reaction, an excess of quaternizing agent is preferred. This excess can be selected as desired and in the extreme case the quaternizing agent can also be used as solvent. However, the selection of the halogen group is also fundamentally important for the quaternization speed as the reaction speed rises, as is known, in the sequence Cl—, Br—, I—.

An analogous situation also applies to the use of the protonic acids falling in class b), which however, generally react more rapidly than the reagents of class a).

Among the groups of solvents cited above which can be considered for carrying out the quaternization reaction with quaternizing agents of class a), those solvents are preferred which were already present at the preparation of the precursor, namely, of the formed organosiloxane amine of formula (v).

Under this technically practical aspect, solvents such as linear or branched alcohols with 1 to 10 C atoms or toluene, o-, m-, p-xylene or mixtures thereof assume an special position. This is especially applicable if the organosiloxane amine according to formula (Y) is quaternized while still moist with solvent.

Generally, the use of a solvent can likewise be eliminated in the protonation of the spherical, polymeric organosiloxane amine with inorganic or organic protonic acids, in which the organosiloxane amine can be used either while still moist with solvent or dried. If, however, a solvent is to be used, then it should be selected with consideration given to the special nature of the acid. If an easily manageable acid which is liquid at room temperature is involved, it is preferably used in pure substance. Otherwise, solutions in water and linear or branched alcohols with 1 to 10 C atoms can be used.

When quaternizing agents of class a) are used, the preferred quaternizing temperatures are preferably above room temperature since elevated temperatures distinctly increase the reaction speed, in an analogous manner to customary quaternizations. An elevation of the reaction temperatures can be associated in the case of low-boiling quaternizing agents with a rise in pressure over the normal pressure. There is a basic connection between the type of quaternizing agent, the quaternization temperature and the quaternization time, namely, that in the case of sterically rather bulky groups; i.e. alkyl, cycloalkyl or benzyl halogenides, higher reaction temperatures and longer reaction times should be set.

The same also generally applies to the quaternizing agents protonic acids, which typically react rapidly and completely even at room temperature.

A separation of gaseous components after a completed reaction can be necessary if quaternizing agents are used which are gaseous at room temperature, such as e.g. methyl chloride, or if slight amounts of gaseous byproducts are formed at rather high quaternization temperatures.

The separation of the quaternization product from the liquid phase can take place by means of customary techniques such as decanting, filtering, centrifuging or removal by suction.

A special embodiment of the method of the invention provides that the quaternization product, which has been freed of gaseous components and of the liquid phase but is still moist, is subjected before an extraction to another temperature treatment over a period up to 100 hours at temperatures up to 200° C. in one of the solvents suggested for quaternization which is optionally acidified with a hydrohalide acid. This treatment can further improve the mechanical properties of the spherical organosiloxane amine.

A washing or extraction of the formed product before a subsequent drying can be advantageous if a high-boiling solvent is used during the quaternization or is introduced into the reaction mixture by the formed amine which is still moist with solvent, which high boiling solvent cannot be removed in the subsequent drying.

The reaction steps of tempering after the drying serves to raise the mechanical stability of the formed organosiloxane ammonium compound.

According to a special embodiment, the organosiloxane ammonium compound formed according to formula (I) is not dried after completed quaternization but rather supplied after the washing with water or another solvent directly for further usage. In these instances the product present in the form of spheres has already been solidified to such an extent under the quaternizing conditions that the drying can be dispensed with.

All formed, polymeric ammonium compounds which can not be obtained by direct quaternization of the formed, polymeric amine. That is, those compounds in which the quaternary nitrogen atom is completely substituted with organyl groups and X stands for an anion according to formula (I), but not for halogenide, are obtainable by reacting the formed, undried, dried and/or tempered, polymeric organosiloxane ammonium compound obtained by direct quaternization with an inorganic or organic reagent. This reagent can dissociate into a cation and an anion, for the reciprocal exchange of anions according to the static or dynamic ion-exchange principle. This ion-exchange method also comprises an ion exchange in the form of a neutralization like that which can be completed in already known ion-exchange resins according to the static or dynamic principle.

The ion exchange can therefore be carried out in an agitated suspension of the formed, polymeric initial ammonium compound with the at least partially dissolved reactant. The insoluble, polymeric ammonium compound in aqueous suspension or in an organic suspension medium preferably of a polar nature is brought in contact thereby with the at least partially dissolved reaction component with which the exchange is to be performed. Subsequently, the formed solid is separated and optionally agitated again with fresh solution of the reactant. This process is repeated until the ion exchange has been quantitatively completed.

Subsequently, the solid can be washed salt-free, separated according to customary techniques such as filtering, centrifuging and/or decanting, washed, and dried at room temperature or an elevated temperature up to 250° C. Optionally, a vacuum or an atmosphere of protective gas can be used. Tempering takes place at a temperature of 100°-300° C. over a period of up to 100 hours, optionally under an atmosphere of protective gas or in a vacuum. The product is subsequently classified in various particle sizes. Individual process steps can be eliminated or carried out in another sequence.

If the work is performed according to the dynamic principle, the polymeric initial ammonium compound is used as ion-exchange bed, which is optionally also agitated, and is brought in contact with the solution of the at least partially dissolved reactant After treatments in the scope mentioned can also be provided here as in the products obtained according to the static method.

If a ion-exchange column is used as ion-exchange bed, then the formed, polymeric initial product must exhibit a minimum particle size which should also be determined as a function of the column dimension. After the exchange has been completed, the substance is also washed salt-free here and then either after treatments or further exchange measures can be carried out.

Although the subject matter of the invention resides in making available formed, spherical organopolysiloxane ammonium compounds and appropriate methods of their preparation, it can be necessary in exceptional instances to convert the formed product with its defined physical qualities into an unformed, fine state. This is of course readily possible according to customary techniques of comminution in moist or dry form without the chemical composition of the organopolysiloxane ammonium compounds being changed.

The most important application of these formed products is based on the capacity of the formed, polymeric ammonium compounds for anion exchange, namely, their use as a universally utilizable anion exchanger. The products exhibit other advantages in the area of application technology in addition to the advantages of the very temperature-stable and solvent-stable matrix; namely, the strongly fixed ammonium groups are inert to being detached and they lack swelling capacity in aqueous or organic medium.

Another aspect of the use of these formed, polymeric ammonium compounds is the exchange, that is, the binding of metal anions which can take place in a very high dilution state. This binding of metal anions wherein naturally multivalent ones are preferred, takes place analogously to the binding of customary inorganic or organic anions. This quality can be used e.g. to remove undesired metals from waste water or to recover valuable metals from very dilute solutions.

The decomposition of the formed, polymeric organosiloxane ammonium compounds does not take place in air until far above 200° C. or under an atmosphere of protective gas at approximately 400° C.

DESCRIPTION OF DETAILED EMBODIMENT

Example 1

200 g of a tertiary aminosilane of the formula $N[(CH_2)_3Si(OC_2H_5)_3]_3$ were combined with 200 ml ethanol in a cylindrical 2-liter glass vessel with double jacket, KPG agitator on top with crescent-shaped [half-moon] agitator blade, reflux condenser and drop funnel. After heating to reflux temperature, the solution was compounded with 70 ml desalinated water and then agitated 15 min. further under reflux. The mixture was cooled down to 55° C. and this temperature was maintained until gelling started. 3 minutes after the start of gelling 400 ml xylene 50° C. warm were added to the developing gel. The agitation was set to 600 rpms and after a clear, viscous solution had been formed again, 400 ml desalinated water 50° C. warm were added. 2 g polyethylene glycol (Mowiol 4–98) had been previously dissolved in the 400 ml water. The 2-phase system was heated to reflux temperature and agitated a further 2 hours at 600 rpms. Then, the flask contents were cooled down and the aminosiloxane $N[(CH_2)_3SiO_{3/2}]_3$, which was completely present in the form of spheres, filtered off from the liquid phase and transferred into a 2-liter steel autoclave. After the addition of 250 ml xylene, the autoclave was sealed and 100 ml methyl chloride added to the contents from a pressure receiver. The autoclave contents were heated to 130° C. under slow agitation and agitated 3 hours at this temperature. The contents were then cooled down and the excess methyl chloride evaporated and recovered. The product suspension removed from the autoclave was transferred onto a filter and the solid filtered off. The solid present in the form of spheres was suspended in water to form a slurry and washed with a total of 2 liters water. The solid was dried in air at room temperature and then classified into particle sizes. A total of 112 g product of the composition:

[(H₃C)N(CH₂CH₂CH₂SiO₃/₂)₃]+Cl— were obtained of which 98% exhibited a particle size of 0.3-2.0 mm. According to a sample drying, the product exhibited a bulk density of 750 g/l. After having been placed in water, a so-called dry substance in relation to volume (according to DIN 54 408) of 590 g/l was calculated. The product exhibited a specific surface of 85 m²/g a pore volume of 0.4 ml/g and a Cl— content of 10.25% (theory: 10.22%).

Example 2

100.4 g N[(CH₂)₃Si(OC₂H₅)₃]₃, 99.6 g Si(OC₂H₅)₄ and 200 ml ethanol were combined in a cylindrical 2-liter glass vessel with double jacket, KPG agitator, reflux condenser and drop funnel. After the addition of 70 ml water, the solution was heated to reflux temperature and agitated 25 min. at this temperature. The charge gelled after cooling down to 70° C. Two minutes after the start of gelling, 375 ml warm toluene at 60° C. were added and the agitation set at 700 rpms. The mixture was heated and 375 ml water added when it reached 70° C. The mixture was then agitated 45 min. under reflux, then cooled down and the suspension transferred onto a filter. The liquid phase was separated and the formed product transferred into a 2-liter steel autoclave. After the addition of 300 ml toluene, the autoclave was sealed and 80 ml methyl chloride added to the contents from a pressure receiver. The autoclave contents were heated under slow agitation to 120° C. and agitated 5 hours at this temperature. Then the contents were cooled down and excess methyl chloride evaporated. The solid present in the form of spheres was filtered from the liquid phase and transferred into a drying oven. It was dried there for 4 hours at first at 80° C., 4 hours at 100° C. and 16 hours at 130° C. under an N₂ atmosphere and subsequently tempered 24 hours at 180° C., likewise under an N₂ atmosphere. After having cooled down to room temperature, the solid was classified into its particle sizes. 97% of the total of 85.0 g product obtained exhibited a particle size between 0.1-0.8 mm.

Cl— content: 6.8% (theory: 6.7%).
Spec surface: 456 m²/g.
Pore volume: 0.7 ml/g.

The formed, polymeric product consisting of units of the formula:

[(H₃C)N(CH₂CH₂CH₂SiO₃/₂)₃]+Cl—.3SiO₂ was subsequently aerated 48 hours in a column with air saturated with water vapor and then slurried in water.

The product exhibited a dry substance in relation to volume (according to DIN 54 408) of 370 g/l.

Example 3

100 g of the tertiary aminosilane of the formula N[(CH₂)₃Si(OC₂H₅)₃]₃ were first converted in an analogous manner to example 1 into a formed, polymeric organosiloxane amine consisting of polymer units of the formula N[(CH₂)₃SiO₃/₂]₃. The essentially xylene-moist, spherical product was transferred into a 1-liter autoclave and compounded with 200 ml xylene as well as 60 g propargyl chloride. The suspension was heated under slow agitation to 130° C. and agitated 5 hours at this temperature. It was then cooled off, the solid present in the form of spheres filtered from the liquid phase and then dried 2 hours at 100° C. and 22 hours at 150° C. 56.6 g product consisting of polymer units of the formula:

[(CH≡C—CH₂)N(CH₂CH₂CH₂SiO₃/₂)₃]+Cl— particle size of 0.3-1.2 mm.
Cl— content: 9.35% (theory: 9.6%).
Spec. surface area: 169 m²/g.
Spec. pore volume: 0.5 ml/g.
Bulk density: 670 g/l. After a 48-hour aeration with moist air, the product was slurried in water.
Dry substance in relation to volume (DIN 54 408): 580 g/l.

Example 4

100 g of the tertiary aminosilane of the formula N[(CH₂)₃Si(OC₂H₅)₃]₃ were first converted in an analogous manner to example 1 into a formed, polymeric organosiloxane amine consisting of polymer units of the formula N[(CH₂)₃SiO₃/₂]₃. The essentially xylene-moist, spherical product was transferred into a 1-liter autoclave and compounded with 130 ml xylene as well as 70 g 2-chloroethanol. The suspension was heated under slow agitation to 130° C. and agitated 3 hours at this temperature. It was then cooled off and the formed material filtered from the liquid phase and transferred after a wash with ethanol to a drying oven. After 4 hours drying at 80° C. and 20 hours drying at 130° C. under a slight vacuum, 55.6 product were obtained with a particle size of 0.2-1.4 mm.

Cl— content 9.80% Cl— (theory: 9.4%).
Spec. surface area: 211 m²/g.
Spec. pore volume: 0.8 ml/g.
Bulk density: 690 g/l.
After a 48-hour aeration with moist air, the product was slurried in water.
Dry substance in relation to volume (DIN 43 408) 570 g/l.

Example 5

200 g of the tertiary aminosilane of the formula N[(CH₂)₃Si(OC₂H₅)₃]₃ were first converted in an analogous manner to example 1 into a formed, polymeric organosiloxane amine consisting of polymer units of the formula N[(CH₂)₃SiO₃/₂]₃. After transfer of the aminosilane to a 2-liter autoclave, it was compounded with 250 ml xylene and 130 ml isopropyl chloride. After a 6-hour reaction time at 130° C. and further work-up analogously to example 4, 105.3 g polymeric product were obtained consisting of polymer units of the formula:

[(CH₃)₂CH—N(CH₂CH₂CH₂SiO₃/₂)₃]⁺Cl⁻ with a particle size of 0.3–1.4 mm.
Cl⁻ content: 8.8% Cl⁻ (theory: 9.45%).
Spec. surface area: 461 m²/g.
Spec. pore volume: 0.9 ml/g.
Bulk density: 481 g/l.
Dry substance in relation to volume (DIN 54 408): 412 g/l.

Example 6

100 g of a secondary aminosilane of the formula HN[(CH₂)₃Si(OC₂H₅)₃]₂, 100 ml ethanol and 150 ml octanol were combined in a cylindrical 1-liter glass vessel fitted with a double jacket, KPG agitator on top with crescent-shaped agitator blade, reflux condenser and drop funnel. The solution was heated to reflux temperature and compounded at the boiling point with 15 ml desalinated water. The mixture was agitated 15 min. under reflux and then cooled to 35° C. As soon as the gelling started, 150 ml octanol were added to the mixture. After the agitation speed had been set to 500 rpms and after a homogenization of the mixture, 300 ml desalinated water were added. The mixture was then heated to reflux temperature and agitated 1 hour at this temperature. After the mixture cooled off, the solid, present in the form of spheres, and consisting of polymer units of the formula HN[(CH₂)₃SiO₃/₂]₂, was transferred to a 1-liter autoclave, compounded with 200 g octyl chloride and agitated 10 hours at 130° C. The solid was then filtered from the liquid phase, washed with ethanol, then subjected for a further 24 hours to a temperature treatment in a 2% aqueous solution of hydrochloric acid (200 ml) at 100° C. and then dried 4 hours at 60° C. and 16 hours at 130° C. 78.4 g polymeric product were obtained consisting of polymer units of the formula:

[(C₈H₁₇)HN(CH₂CH₂CH₂SiO₃/₂)₂]⁺Cl⁻ with a particle size of 0.3–1.6 mm.
Cl⁻ content 9.5% (theory: 10.1%).
Spec. surface area: 540 m²/g.
Spec. pore volume: 1.8 ml/g.
Bulk density: 380 g/l.
After a 48-hour aeration with moist air, the product was slurried in water.
Dry substance in relation to volume: 180 g/l.

Example 7

100 g HN[(CH₂)₁₀Si(OCH₃)]₂, 77 g Si(OC₂H₅)₄, 50 ml ethanol, 25 ml H₂O and 75 ml hexanol were combined in an agitated vessel and heated to reflux temperature. The mixture was refluxed (approximately 2 hours) until gelation started. 5 minutes after the start of gelation, 150 ml warm water (70° C.) in which 1 g Mowiol had previously been dissolved were added to the gel. The mixture was then agitated a further 4 hours at 600 rpms under reflux, then cooled off. The entire reaction mixture was transferred onto a filter and the solid filtered from the liquid phase and washed with ethanol. The solid present in the form of spheres was transferred to a 1-liter autoclave, compounded with 150 ml ethanol and 40 ml methyl chloride and agitated 24 hours at 120° C. After further treatment analogously to example 6, 103.2 g polymeric product were obtained consisting of polymer units of the formula:

{(H₃C)HN[(CH₂)₁₀SiO₃/₂]₂}⁺Cl⁻ with a particle size of 0.3–2.2 mm.
Cl⁻ content: 6.2% (theory: 6.4%).
Spec. surface area: <1 m²/g.
Spec. pore volume: non-measurable.
Bulk density: 630 g/l.

Example 8

161.9 g N[(CH₂)₃Si(OC₂H₅)₃]₃, 38.1 g (H₃C)₂Si(OC₂H₅)₂ and 70 ml water were combined in 200 ml ethanol. Analogously to example 2, after 15 min. reflux, gelling at 70° C., addition of 320 ml xylene, 45-minute agitation at 500 rpms under reflux, transfer into a steel autoclave and quaternization with methyl iodide (150 g) as well as after drying and tempering, 148.6 g of a polymeric ammonium compound were obtained which consisted of polymer units of the formula:

[(H₃C)N(CH₂CH₂CH₂SiO₃/₂)₃]⁺I⁻·(CH₃)₂SiO₂/₂

Particle size: 98% between 0.3 and 1.6 mm.
I⁻ content: 20.6% (theory: 21.6%).
Spec. surface area: <1 m²/g.
Spec. pore volume: non measurable.
Bulk density: 650 g/l.
After a 48-hour aeration with moist air, the product was slurried in water.
Dry substance in relation to volume: 490 g/l.

Example 9

100 g $$\text{HN[CH}_2\overset{\overset{\displaystyle CH_3}{|}}{\text{CH}}\text{CH}_2\text{Si(OC}_3\text{H}_7\text{)}_3]_2,$$

130 ml isopropanol and 30 ml water were agitated in a cylindrical 1-liter glass vessel 15 min. under reflux, then cooled to 70° C. and slowly agitated further until gelling started. Immediately after the start of gelling, 250 ml 2-ethylhexanol, then 142.6 g Zr(OC₄H₉)₄ and finally 250 ml water were added to the forming gel. After the agitation had been set to 500 rpms, the mixture was agitated 2 hours under reflux, then cooled down and the solid present in the form of spheres filtered off, extracted twice with 200 ml isopropanol each time and transferred to an autoclave. After the addition of 400 ml isopropanol and 50 ml methyl chloride, the mixture was agitated 5 hours at 130° C., then cooled down and the product present in the form of spheres slurried directly in water and extracted again with water. 97.8 g product were obtained which consisted of polymer units of the formula:

$$\{(H_3C)HN[(CH_2\overset{\overset{\displaystyle CH_3}{|}}{CH}CH_2SiO_{3/2}]_2\} + Cl^- \cdot 2ZrO_2$$

Particle size: 0.2–1.8 mm (99%).
Cl⁻ content: 6.5% (theory: 6.7%).
Spec. surface area: 286 m²/g.
Spec. pore volume: 0.7 ml/g.
Bulk density: 562 g/l.
Dry substance in relation to volume: 470 g/l.

Example 10

200 g

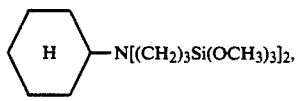

200 ml ethanol and 70 ml water were agitated in a cylindrical 2-liter glass vessel for 45 min. at first under reflux. After the mixture had cooled down to 75° C., the charge gelled and 1 min. after the start of gelling 400 ml diisopropyl ether was added at first, then 134.2 g Ti-(OC$_3$H$_7$)$_4$ and finally 500 ml water. The mixture was then agitated 2 hours at 600 rpms under reflux, then cooled down and the product in the form of spheres filtered from the liquid phase and then compounded with 400 ml diisopropyl ether. Hydrochloric-acid gas was passed under slow agitation through this suspension at room temperature over a period of 8 hours until no more absorption by the solid was able to be observed. The suspension was then agitated 3 hours further under reflux, then cooled down and the liquid phase removed by suction. The solid present in the form of spheres and consisting of the formula:

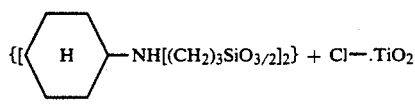

was washed with water and then directly used further.
Particle size: 0.3–2.4 mm.
Cl⁻ content: 8.9% (theory: 8.8%).
Spec. surface area: 513 m²/g.
Spec. pore volume: 1.2 ml/g.
Bulk density: 470 g/l.
Dry substance in relation to volume: 360 g/l.

Example 11

200 g N[(CH$_2$)$_3$Si(OCH$_3$)$_3$]$_3$ diluted with 200 ml methanol were compounded in boiling heat with 60 ml H$_2$O and immediately cooled down to 50° C. 500 ml warm 50° decanol were added 30 sec. after the start of gelling. After the complete homogenization of the mixture, 97.8 g Al(OC$_4$H$_9$)$_3$ were added at first and after another minute 500 ml water 50° C. warm were added. The agitation was set at 500 rpms and the mixture was then agitated 2 hours under reflux temperature. The mixture was then cooled down, the solid present in the form of spheres separated from the liquid phase, washed twice with n-butanol and finally compounded with 300 ml butanol and transferred to an autoclave where 100 ml methyl chloride were added. The formed solid was agitated 4 hours at 130° C. and then worked up in a manner analogous to that of example 10. 156.3 g formed product were obtained which consisted of polymer units of the formula:

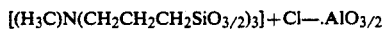

Particle size: 98% between 0.1–2.2 mm.
Cl⁻ content: 8.7%.
Spec. surface area: 470 m²/g.
Spec. pore volume: 1.3 ml/g.
Bulk density: 490 g/l.
Dry substance in relation to volume: 370 g/l.

Example 12

200 g

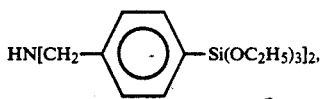

200 ml ethanol and 70 ml water were agitated in a cylindrical 2-liter glass vessel for 45 min. at first under reflux. After the mixture had cooled down to 70° C., the charge gelled and immediately after the start of the gelling 500 ml octanol, then 79.0 g C$_3$H$_7$Si(OC$_2$H$_5$)$_3$ and finally 500 ml water were added. The mixture was subsequently agitated 2 hours at 600 rpms under reflux, then cooled down, the solid present in the form of spheres filtered off, extracted 3 times with 400 ml ethanol per time and dried 6 hours at 80° C., 6 hours at 100° C. and 12 hours at 130° C. under nitrogen. After a 48-hour aeration with moist air, the product was slurried in water and then transferred into a column. The column was subsequently charged within 1 hour with 1 liter 5% HCl solution and then washed with 2 liters water. The product, consisting of polymer units of the formula:

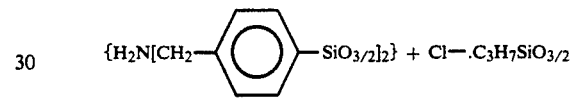

was then dried 6 hours at 80° C. and 12 hours at 100° C. 159.3 g product were able to be obtained with a particle size of 0.3–1.4 mm.
Cl⁻ content: 8.2%.
Spec. surface area: 96 m²/g.
Spec. pore volume: 0.5 ml/g.
Bulk density: 530 g/l.
Dry substance in relation to volume: 490 g/l.

Example 13

Starting with 161.9 g N[(CH$_2$)$_3$Si(OC$_2$H$_5$)$_3$]$_3$, 19.05 g (CH$_3$)$_2$Si(OC$_2$H$_5$)$_2$ and 26.8 g Si(OC$_2$H$_5$)$_4$ 108.7 g of a polymeric ammonium compound were obtained analogously to example 2 consisting of units of the formula:

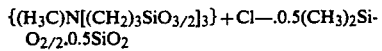

Particle size distribution: 0.3–1.4 mm.
Cl⁻ content: 8.5%.
Spec. surface area: 310 m²/g.
Spec. pore volume: 0.62 ml/g.
Bulk density: 580 g/l.
Dry substance in relation to volume: 480 g/l.

Example 14

200 g of a tertiary aminosilane of the formula N[(CH$_2$)$_3$Si(OC$_2$H$_5$)$_3$]$_3$ were converted analogously to example 1 to the aminosiloxane of the formula N[(CH$_2$)$_3$SiO$_{3/2}$]$_3$. After a 4-hour drying at 88° C., 4-hour drying at 100 C and 16-hour drying at 130° C. under an atmosphere of N$_2$, the product was aerated 48 hours in a column with air saturated with water vapor and then slurried in water. The column was then charged with 1 liter 3% aqueous HCl solution within 1 hour and then washed with 2 liters water. After a 4- hour drying at 30° C. and a 10-hour drying at 100° C., 105.6 product of the formula:

were obtained.
Particle size: 0.3–2.0 mm
Cl⁻ content: 10.6%.
Spec. surface: 152 m²/g.
Bulk density: 620 g/l.
Dry substance in relation to volume: 500 g/l.

Example 15

50 ml of the formed organosiloxane ammonium compound prepared in accordance with example 1 were transferred into a column and charged with 250 ml 2% ammonia solution within 30 min. The mixture was then washed with 250 ml water and wash solution and flow [i.e. that which passed through, flowthrough] combined with each other. The amount of Cl— determined therein was 3.0 g (99.6% of theory). The ion exchanger, which was now present in the OH— form, was again converted quantitatively into the Cl-form by reaction with 100 ml 1n-HCl solution, as was able to be determined by back titration of the excess acid.

Example 16

50 ml of the formed organosiloxane ammonium compound prepared in accordance with example 1 were completely converted with 300 ml 8% NaHCO₃ solution analogously to example 14 into a product consisting of polymer units of the formula:

After a 6-hour drying at 80° C. and a 10-hour drying at 100° C., 31.6 g were obtained.

Example 17

50 ml of the formed organosiloxane ammonium compound prepared in accordance with example 1 were transferred into a column. The column was subsequently charged within 1 hour with 1 liter solution which exhibited a chromate concentration of 10 ppm. The mixture was then washed with 200 ml water and a chromate analysis performed on the entire flow. According to this analysis, the chromate concentration was less than 0.1 ppm.

Further variations and modifications will be apparent to those skilled in the art from the foregoing and are intended to be encompassed by the appended claims.

German priority application P 38 00 564.6-44 is relied on and incorporated herein.

We claim:

1. A method of preparing spherically formed, polymeric organosiloxane ammonium compounds, consisting of units of the general formula:

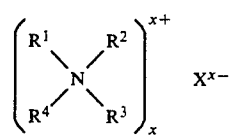

in which R¹ and R² are identical or different and represent a group of the general formula:

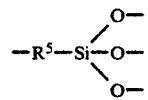

in which the nitrogen atoms in (I) are connected to the silicon atoms in (II) via the R⁵ groups and R⁵ represents alkylene with 1 to 10 C atoms, cycloalkylene with 5 to 8 C atoms or a unit of the general formula:

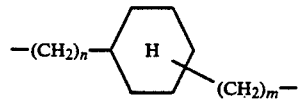

or

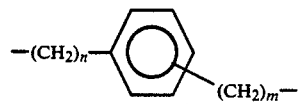

in which n is a number from 1 to 6 and is the number of methylene groups attached to the nitrogen atom, and m is a number from 0 to 6, and the free valences of the oxygen atoms bound to the silicon atom are saturated as in silica skeletons by (a) silicon atoms of further groups of formula (II), or (b) with a metal atoms of one or more of the cross-linking binding links

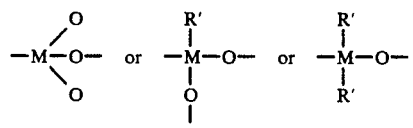

or

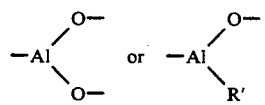

in which M is a silicon, titanium or zirconium atom and R' a linear or branched alkyl group with 1 to 5 C atoms and the ratio of the silicon atoms of the groups of general formula (II) to the metal atoms in the binding links is 1:0 to 1:10, or a combination of (a) and (b), and in which R³ is R¹, R², hydrogen, a linear or branched alkyl group containing 1 to 20 C atoms, a cycloalkyl group containing 5 to 8 C atoms or is the benzyl group and R⁴ is equal to hydrogen, a linear or branched alkyl group with 1 to 20 C atoms or a cycloalkyl, benzyl, allyl, propargyl, chloroethyl, hydroxyethyl, chloropropyl group containing of 5 to 8 C atoms, X is an anion and is selected from the group of halogenide, hypochlorite, sulfate, hydrogen sulfate, nitrite, nitrate, phosphate, dihydrogen phosphate, hydrogen phosphate, carbonate, hydrogen carbonate, hydroxide, chlorate, perchlorate, chromate, dichromate, cyanide, cyanate, rhodanide, sulfide, hydrogen sulfide, selenide, telluride, borate, metaborate, azide, tetrafluoroborate, tetraphenylborate, hexafluorophosphate, formate, acetate, propionate, oxalate, trifluoroacetate, trichloroacetate or benzoate, and x is an integer with a value of 1, 2 or 3 and corresponds to the valence of the anion X, wherein said polymeric compound is in the form of macroscopically spherical particles with a diameter of 0.01 to 3.0 mm, a specific surface area of up to 1000 m²/g, a specific pore volume of 0 to 5.0 ml/g, a bulk density of 50 to 1000 g/l as well as a dry substance weight of 50 to 750 g/l, said method comprising dissolving (i) a secondary or a tertiary aminosilane of the formula:

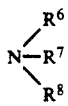 (III)

in which $R^6$ and $R^7$ are identical or different and represent a group of the formula:

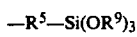 (IV)

$R^5$ has the same meaning as in formula (II), $R^9$ is a linear or branched alkyl group with 1 to 5 C atoms and $R^8$ is equal to $R^6$ and $R^7$ or hydrogen, a linear or branched alkyl group with 1 to 10 C atoms, a cycloalkyl group containing 5 to 8 atoms or to the benzyl group, and (ii) optionally cross-linking agents, in a solvent which is miscible to a great extent in water but dissolves aminoorganosilane and cross-linking agents, adding an amount of water which is sufficient at least for the complete hydrolysis and condensation to the solution under agitation, allowing the reaction mixture formed thereby to gel under further agitation at a determined temperature in a range from room temperature to 200° C., compounding the reaction mixture at the start of gelation or up to one hour thereafter with 10 to 2000% by weight, in relation to the total amount of aminoorganosilane (III) and optionally of cross-linking agents, with a solvent which is non-soluble in water to a great extent but which dissolves the reaction mixture and homogenizing, adding water in the amount of 10 to 2000% by weight, in relation to the total amount of aminoorganosilane and any cross-linking agents, to the viscous homogenizate immediately or over a period of time up to one hour, dispersing the organic phase, in the liquid two-phase system and separating the solid which forms in the form of spheres after a reaction time sufficient therefor at room temperature to 200° C. from one liquid phase, drying at room temperature to 250° C., and tempering 1 to 100 hours at temperatures from 150° to 300° C. and classifying, and then reacting the polymeric, formed organosiloxane amine obtained thereby of the formula:

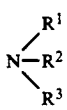 (V)

in which $R^1$, $R^2$ and $R^3$ have the same significance as in formula (I) with a stoichiometric amount of:

a) a linear or branched alkyl halogenide containing 1 to 20 C atoms, a cycloalkyl halogenide or benzyl halogenide containing 5 to 8 C atoms in which the halogen is chlorine, bromine or iodine atom, or b) an inorganic or organic protonic acid, at temperatures from room temperature to 250° C. and at a pressure corresponding to the sum of the partial pressures of the components of the reaction mixture at the particular temperature over a period of a few minutes to several days, freeing the polymeric, formed organosiloxane ammonium product formed thereby from gaseous components, then separating from the liquid phase, washing with solvent or with water or extracting, drying the product at normal pressure under a vacuum partially or completely under protective gas at a temperature from room temperature to 250° C. for 1 to 60 hours, tempering at 100° to 300° C. for a period of up to 100 hours and classifying.

2. The method of preparing a spherically polymeric, formed organosiloxane ammonium compound according to claim 1, in which the quaternary nitrogen atom is completely substituted with organyl groups and X stands for an anion according to formula (I) except halogen, said method further comprising reacting said polymeric, formed organosiloxane ammonium compound in which the quaternary nitrogen is completely substituted with organyl groups and X stands for halogen with an inorganic or organic reagent which can dissociate into a cation and an anion for the reciprocal exchange of the anions according to the static or the dynamic ion exchange principle and optionally separating from the liquid phase, washing, drying, tempering and/or classifying.

3. The method according to claim 1, wherein there is added one or more cross-linking agents of the general formula:

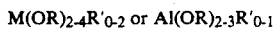

in which M is a silicon, titanium or zirconium atom, R' a linear or branched alkyl group with 1 to 5 C atoms and the ratio of silicon atoms of the groups of the general formula (IV) to the metal atoms in the cross-linking agents is 1:0 to 1:10.

4. The method according to claim 1, wherein the reaction takes place in the presence of a solvent or solubilizer selected from the group of cyclic or open-chain ethers, chlorinated hydrocarbon compounds, aliphatic or aromatic nitro compounds, aliphatic or aromatic nitriles, open-chain or cyclic aliphatic hydrocarbons, unsubstituted aromatics or aromatics substituted with alkyl groups, linear or branched alcohols with 1 to 12 C atoms, symmetric or asymmetric ketones with 3 to 8 C atoms or of dimethyl formamide, dimethyl sulfoxide or water.

5. The method according to claim 1, further comprising reacting the formed, polymeric amine of formula (V) undried and moist with solvent immediately after its formation with a linear or branched alkyl halogenide containing 1 to 20 C atoms, with a cycloalkyl halogenide containing 5 to 8 C atoms or with benzyl halogenide in which the halogen group is equal to a chlorine, bromine or iodine atom to quaternize said amine.

6. The method according to claim 5, wherein a linear or branched alcohols with 1 to 10 C atoms, toluene, o-, m-, p-xylene or mixtures thereof or water are used as solvent in the reaction to quaternize.

7. The method according to claim 6, wherein the still moist product is subjected to a temperature treatment for a period up to 100 hours at temperatures up to 200° C.

8. The method according to claim 7, wherein the solvent-moist, quaternization product is treated by extracting with water or suitable solvent and is left un-dried after extraction.

9. An ion exchanger comprising spherically formed, polymeric, organosiloxane ammonium compound, consisting of units of the general formula:

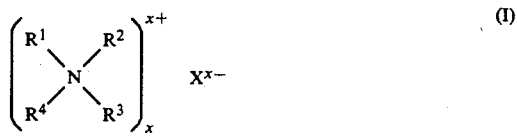

in which $R^1$ and $R^2$ are identical or different and represent a group of the general formula:

in which the nitrogen atoms in (I) are connected to the silicon atoms in (II) via the $R^5$ groups and $R^5$ represents alkylene with 1 to 10 C atoms, cycloalkylene with 5 to 8 C atoms or a unit of the general formula:

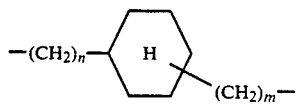

or

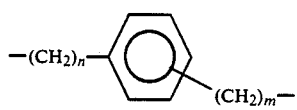

in which n is a number from 1 to 6 and is the number of methylene groups attached to the nitrogen atom, and m is a number from 0 to 6, and the free valences of the oxygen atoms bound to the silicon atom are saturated as in silica skeletons by (a) silicon atoms of further groups of formula (II), or (b) with the metal atoms of one or more of the cross-linking binding links

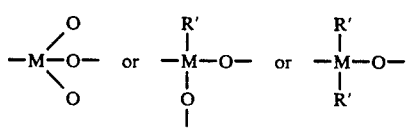

or

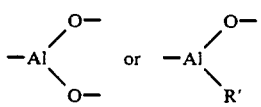

in which M is a silicon, titanium or zirconium atom and R' a linear or branched alkyl group with 1 to 5 atoms and the ratio of the silicon atoms of the groups of general formula (II) to the metal atoms in the binding links is 1:0 to 1:10, or a combination of (a) and (b), and in which $R^3$ is $R^1$, $R^2$, hydrogen, a linear or branched alkyl group containing 1 to 20 C atoms, a cycloalkyl group containing 5 to 8 C atoms or is the benzyl group and $R^4$ is equal to hydrogen, a linear or branched alkyl group with 1 to 20 C atoms or a cycloalkyl, benzyl, allyl, propargyl, chloroethyl, hydroxyethyl, chloropropyl group containing of 5 to 8 C atoms, X is an anion and is selected from the group of halogenide, hypochlorite, sulfate, hydrogen sulfate, nitrite, nitrate, phosphate, dihydrogen phosphate, hydrogen phosphate, carbonate, hydrogen carbonate, hydroxide, chlorate, perchlorate, chromate, dichromate, cyanide, cyanate, rhodanide, sulfide, hydrogen sulfide, selenide, telluride, borate, metaborate, azide, tetrafluoroborate, tetraphenylborate, hexafluorophosphate, formate, acetate, propionate, oxalate, trifluoroacetate, trichloroacetate or benzoate, and x is an integer with a value of 1, 2 or 3 and corresponds to the valence of the anion X, wherein said polymeric compound is in the form of macroscopically spherical particles with a diameter of 0.01 to 3.0 mm, a specific surface area of up to 1000 m²/g, a specific pore volume of 0 to 5.0 ml/g, a bulk density of 50 to 1000 g/l as well as a dry substance weight of 50 to 750 g/l.

10. A method of treating solutions containing metals to remove said metals, comprising contacting a spherically polymeric, formed ammonium compound with said solutions to thereby remove said metals, wherein said spherically formed, polymeric, organosiloxane ammonium compound, consists of units of the general formula:

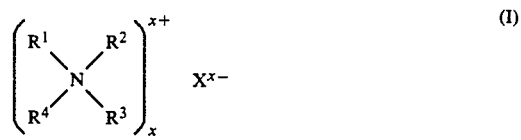

in which $R^1$ and $R^2$ are identical and represent a group of the general formula:

in which the nitrogen atoms in (I) are connected to the silicon atoms in (II) via the $R^5$ groups and $R^5$ represents alkylene with 1 to 10 C atoms, cycloalkylene with 5 to 8 C atoms or a unit of the general formula:

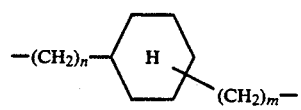

or

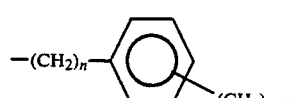

in which n is a number from 1 to 6 and is the number of methylene groups attached to the nitrogen atom, and m is a number from 0 to 6, and the free valences of the oxygen atoms bound to the silicon atom are saturated as in silica skeletons by (a) silicon atoms of further groups of formula (II), or (b) with the metal atoms of one or more of the cross-linking binding links

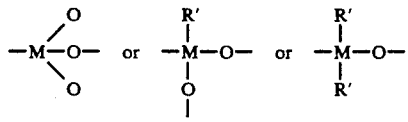

or

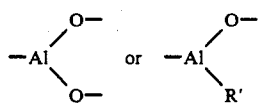

in which M is a silicon, titanium or zirconium atom and R' a linear or branched alkyl group with 1 to 5 C atoms and the ratio of the silicon atoms of the groups of general formula (II) to the metal atoms in the binding links is 1:0 to 1:10, or a combination of (a) and (b), and in which $R^3$ is $R^1$, $R^2$, hydrogen, a linear or branched alkyl group containing 1 to 20 C atoms, a cycloalkyl group containing 5 to 8 C atoms or is the benzyl group and $R^4$ is equal to hydrogen, a linear or branched alkyl group with 1 to 20 C atoms or a cycloalkyl, benzyl, allyl, propargyl, chloroethyl, hydroxyethyl, chloropropyl group containing of 5 to 8 C atoms, X is an anion and is selected from the group of halogenide, hypochlorite, sulfate, hydrogen sulfate, nitrite, nitrate, phosphate, dihydrogen phosphate, hydrogen phosphate, carbonate, hydrogen carbonate, hydroxide, chlorate, perchlorate, chromate, dichromate, cyanide, cyanate, rhodanide, sulfide, hydrogen sulfide, selenide, telluride, borate, metaborate, azide, tetrafluoroborate, tetraphenylborate, hexafluorophosphate, formate, acetate, propionate, oxalate, trifluoroacetate, trichloroacetate or benzoate, and x is an integer with a value of 1, 2 or 3 and corresponds to the valence of the anion X, wherein said polymeric compound is in the form of macroscopically spherical particles with a diameter of 0.01 to 3.0 mm, a specific surface area of up to 1000 m²/g, a specific pore volume of 0 to 5.0 ml/g, a bulk density of 50 to 1000 g/l as well as a dry substance weight of 50 to 750 g/l.

* * * * *